US011237470B2

(12) United States Patent
Chien et al.

(10) Patent No.: US 11,237,470 B2
(45) Date of Patent: Feb. 1, 2022

(54) PROJECTOR

(71) Applicant: QISDA CORPORATION, Taoyuan (TW)

(72) Inventors: Chih-Shiung Chien, Taoyuan (TW); Ming-Kuen Lin, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 0 days.

(21) Appl. No.: 16/985,211

(22) Filed: Aug. 4, 2020

(65) Prior Publication Data

US 2021/0055643 A1 Feb. 25, 2021

(30) Foreign Application Priority Data

Aug. 22, 2019 (CN) .......................... 201910780860.4

(51) Int. Cl.
*G03B 21/20* (2006.01)
*G02B 27/14* (2006.01)

(52) U.S. Cl.
CPC ....... *G03B 21/2066* (2013.01); *G02B 27/141* (2013.01); *G03B 21/204* (2013.01); *G03B 21/208* (2013.01)

(58) Field of Classification Search
CPC .......................... G03B 21/2066; G03B 21/204; G03B 21/208; G02B 27/141

USPC ........................................................ 353/98
See application file for complete search history.

(56) References Cited

U.S. PATENT DOCUMENTS

| 5,217,832 A * | 6/1993 | Joslin ........................ G03F 7/00 |
| | | 359/590 |
| 2016/0241822 A1* | 8/2016 | Takagi ................. H04N 9/3158 |
| 2017/0199451 A1* | 7/2017 | Akiyama ........... G02B 27/0961 |
| 2018/0113244 A1* | 4/2018 | Vasylyev ................ G09F 13/18 |
| 2019/0317388 A1* | 10/2019 | Chen ..................... G03B 21/208 |

* cited by examiner

*Primary Examiner* — Jerry L Brooks
(74) *Attorney, Agent, or Firm* — Winston Hsu

(57) ABSTRACT

A projector includes a light source module, a wavelength conversion module, a first collimator lens, a second collimator lens, a dichroic filter and a reflector. The light source module provides a first beam. The wavelength conversion module includes a reflecting plate and a wavelength conversion layer. The dichroic filter reflects a first part of the first beam to form a second beam, and a second part of the first beam can pass or detour the dichroic filter to form a third beam. The second beam is condensed by the first collimator lens and projected onto the wavelength conversion layer to excite a fourth beam. The third beam is condensed by the second collimator lens and projected onto the reflecting plate to reflect a fifth beam. The fifth beam is reflected via the reflector and the dichroic filter to mix with the fourth beam.

17 Claims, 5 Drawing Sheets

PROJECTOR

BACKGROUND OF THE INVENTION

1. Field of the Invention

The present invention relates to a projector, and more particularly, to a projector with advantages of economizing cost, decreasing noise and small dimensions.

2. Description of the Prior Art

The conventional laser projector utilizes the blue light laser source to provide the illumination beam, as disclosed in U.S. Pat. No. 9,618,737. The illumination beam is transformed into an excitation beam with different color via a wavelength conversion device (such as the color wheel partly covered by phosphor powder or quantum dot material); then, the excitation beam can be mixed with the illumination beam for related application. The conventional alignment module utilizes the dichroic component to reflect the illumination beam toward the color wheel. A portion of the color wheel made by wavelength conversion material generates the excitation beam accordingly, and the excitation beam can pass through the dichroic component. Besides, a part of the illumination beam passes through another portion of the color wheel without wavelength conversion function and moves back the dichroic component via reflecting components, and then is reflected by the dichroic component to mix with the excitation beam. The conventional alignment module has drawbacks of expensive hardware cost and heavy weight due to a large number of optical components.

SUMMARY OF THE INVENTION

The present invention provides a projector with advantages of economizing cost, decreasing noise and small dimensions for solving above drawbacks.

According to the claimed invention, a projector includes a light source module, a wavelength conversion module, a first collimator lens, a second collimator lens, a dichroic filter and a reflector. The light source module is adapted to provide a first beam. The wavelength conversion module includes a reflecting plate and a wavelength conversion layer, and the wavelength conversion layer is an annular structure disposed on the reflecting plate. The first collimator lens is disposed on a position corresponding to the wavelength conversion module. The second collimator lens is disposed on a position corresponding to the wavelength conversion module. The dichroic filter is disposed between the light source module and the first collimator lens. The dichroic filter is adapted to reflect a first part of the first beam to form a second beam and allow passing or detouring of a second part of the first beam to form a third beam. The second beam is condensed by the first collimator lens and projected onto the wavelength conversion layer to excite a fourth beam. The dichroic filter is further adapted to allow passing of the fourth beam. The reflector is disposed between the dichroic filter and the second collimator lens. The third beam is condensed by the second collimator lens and projected onto the reflecting plate to reflect a fifth beam, and the fifth beam is sequentially reflected by the reflector and the dichroic filter to mix with the fourth beam.

According to the claimed invention, the dichroic filter allows passing of a first polarized state beam and reflects a second polarized state beam. The projector further includes a first phase retardation component and a second phase retardation component. The first phase retardation component is disposed between the light source module and the dichroic filter, and adapted to transform the first beam into the third beam with a first polarized state and the second beam with a second polarized state. The second phase retardation component is disposed between the dichroic filter and the wavelength conversion module, and adapted to generate the fifth beam with the second polarized state.

The projector of the present invention can utilize the dichroic filter to divide the beam provided by the light source module into two parts. The dichroic filter can be matched with the wavelength conversion module capable of partly reflecting an illumination beam and partly generating an excitation beam, and the collimator lenses respectively corresponding to the reflecting plate and the wavelength conversion layer, and the reflector used to turn the beam for structuring the alignment module with a least amount of elements inside constrained space for beam mixing. The dichroic filter can change the arrangement position or material property of the plating layer to allow passing or detouring of the beam. The dichroic filter can further provide plural applications; for example, one dichroic filter may reflect some specific-color beam and allow passing of other color beam, or may allow passing of one specific-polarized beam and reflect another polarized beam. Arrangement of the light source module, the dichroic filter and the phase retardation component of the projector may be changed in accordance with the dichroic component having specific features.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
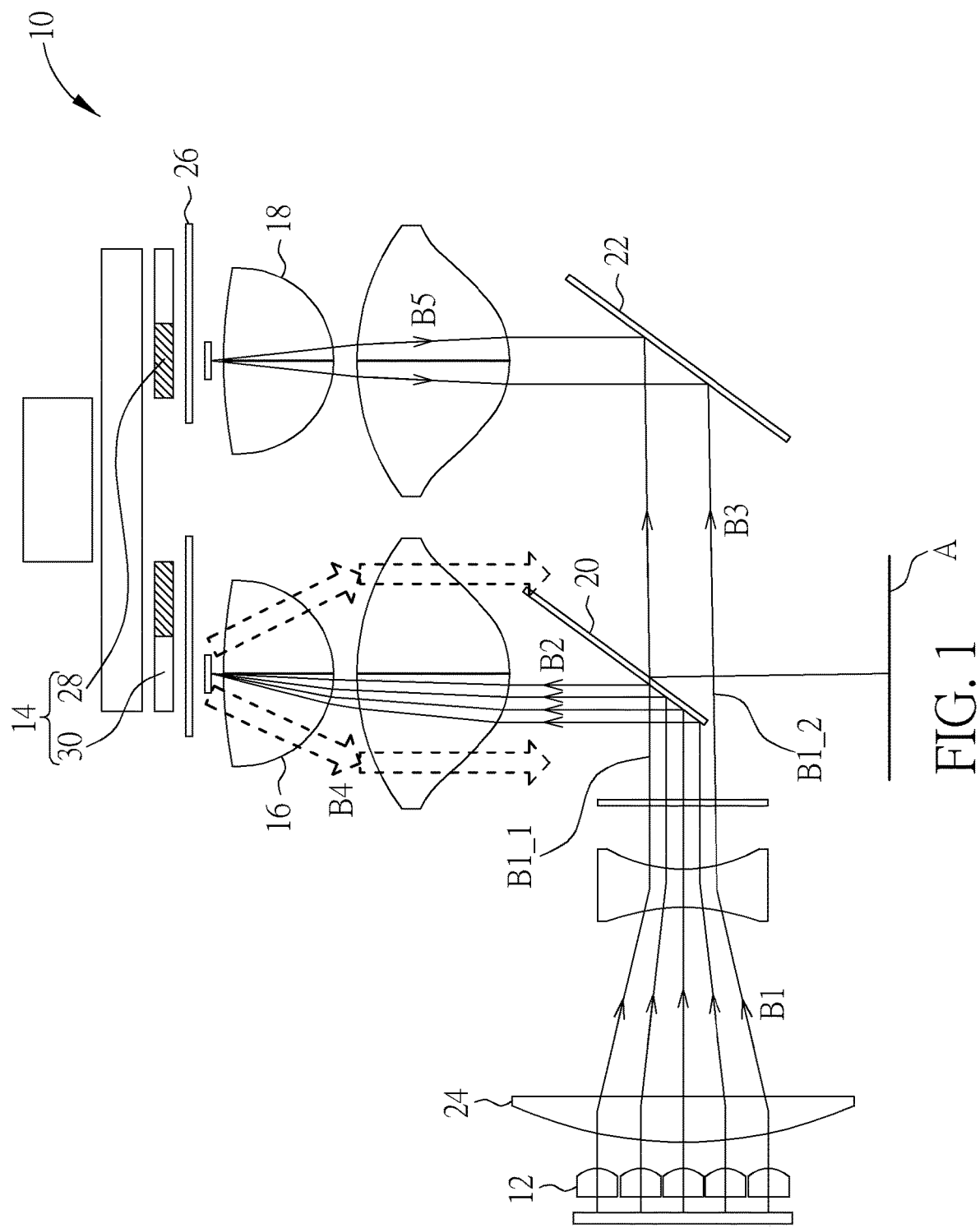
FIG. 1 is a diagram of a projector according to a first embodiment of the present invention.
Figure 2:
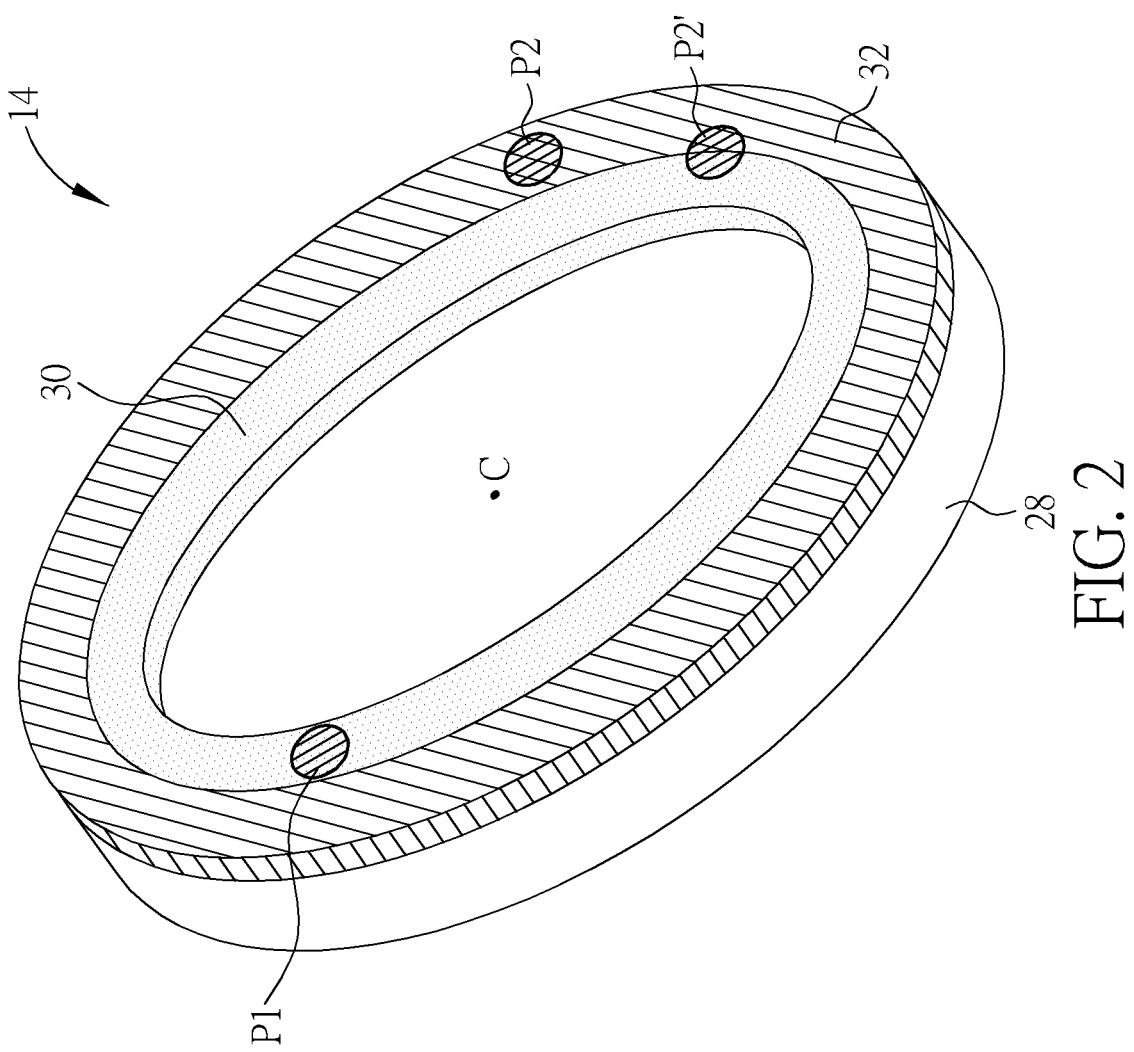
FIG. 2 is a diagram of a wavelength conversion module according to the first embodiment of the present invention.

Please refer to FIG. 1 and FIG. 2. FIG. 1 is a diagram of a projector 10 according to a first embodiment of the present invention. FIG. 2 is a diagram of a wavelength conversion module 14 according to the first embodiment of the present invention. The projector 10 can include a light source module 12, the wavelength conversion module 14, a first collimator lens 16, a second collimator lens 18, a dichroic filter 20, a reflector 22, a light condensing module 24 and a light diffusing component 26. The wavelength conversion module 14 can include a reflecting plate 28 and a wavelength conversion layer 30. The wavelength conversion layer 30 can be an annular structure disposed on the reflecting plate 28. The first collimator lens 16 and the second collimator lens 18 can be disposed on positions respectively corresponding to the wavelength conversion module 14. The dichroic filter 20 can be disposed between the light source module 12 and the first collimator lens 16. The reflector 22 can be disposed between the dichroic filter 20 and the second collimator lens 18. The light condensing module 24 and the light diffusing component 26 are optional elements. The light condensing module 24 can be disposed between the light source module 12 and the dichroic filter 20. The light diffusing component 26 can be disposed between the dichroic filter 20 and the wavelength conversion module 14.

The light source module 12 can provide a first beam B1. The first beam B1 can condense its projection dimension via the light condensing module 24, and then be projected onto the dichroic filter 20. In the first embodiment, a first part B1_1 of the first beam B1 can be reflected by the dichroic filter 20 to form a second beam B2, and a second part B1_2 of the first beam B1 can detour, i.e., pass by the dichroic filter 20 to be a third beam B3. The second beam B2 can be condensed by the first collimator lens 16 and projected onto the wavelength conversion module 14. The wavelength conversion layer 30 can be excited to generate a fourth beam B4. The fourth beam B4 can pass through the dichroic filter 20 and be transmitted toward a photo-receiving area A. The third beam B3 can be turned toward the second collimator lens 18 by the reflector 22, and then condensed by the second collimator lens 18 to project onto the wavelength conversion module 14. A fifth beam B5 can be generated due to reflection of the reflecting plate 28. The fifth beam B5 can be reflected by the reflector 22 and the dichroic filter 20 in sequence for transmitting toward the photo-receiving area A, and then mixed with the fourth beam B4.

The second beam B2, the third beam B3 and the fifth beam B5 can be blue light as if the first beam B1 provided by the light source module 12 is the blue light. The dichroic filter 20 can reflect the blue light and allow passing of other color light, and therefore the fourth beam B4 can be any color light except the blue; for example, the fourth beam B4 may be yellow light. Color of the first beam B1 depends on a property of a light emitting diode of the light source module 12, and color of the fourth beam B4 depends on a material property of the wavelength conversion module 14; an actual application of light color is not limited to the blue light and the yellow light mentioned as above embodiment. The fourth beam B4 and the fifth beam B5 can be mixed in the photo-receiving area A to generate white light.

The wavelength conversion module 14 has a rotatable function. The reflecting plate 28 can be disposed on a rotation axle (which is not shown in the figures), and the wavelength conversion layer 30 is the annular structure based on a center C of the reflecting plate 28. Generally, the annular structure can be a solid layer, so that a contour of the annular structure is filled with wavelength conversion material, as shown in FIG. 2; however, an actual application of the annular structure is not limited to the above-mentioned embodiment. For example, the wavelength conversion layer 30 may include a plurality of laying blocks (which is not shown in the figures), and the plurality of laying blocks is arranged in a separated manner to form the annular structure. In addition, the wavelength conversion module 14 can further include a diffusion layer 32 disposed on the reflecting plate 28 as an annular form. In the embodiment shown in FIG. 2, the diffusion layer 32 can align with an outer side of the wavelength conversion layer 30; in other possible embodiment, the diffusion layer 32 may align with an inner side of the wavelength conversion layer 30. When the wavelength conversion module 14 is rotated, the second beam B2 condensed by the first collimator lens 16 can be continuously projected onto the wavelength conversion layer 30, and the third beam B3 condensed by the second collimator lens 18 can be continuously projected onto the reflecting plate 28 or the diffusion layer 32.

Figure 3:
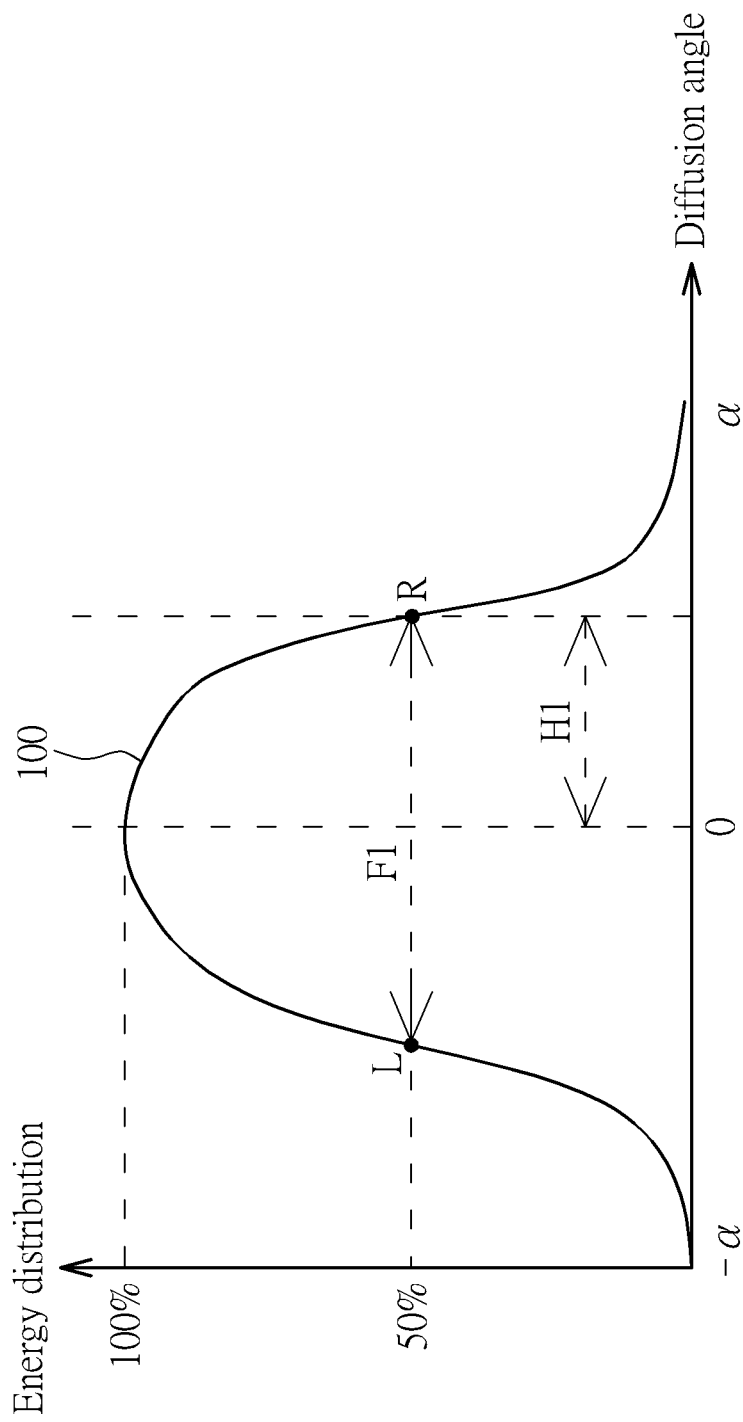
FIG. 3 is a diagram of energy distribution about a diffusion beam generated by a reflecting plate according to the embodiment of the present invention.

The rotatable function of the wavelength conversion module 14 can overcome a drawback of high coherence of an integrated beam mixed by the fourth beam B4 and the fifth beam B5. Besides, the drawback of foresaid high coherence can be improved by changing roughness of the reflecting plate 28. In the present invention, the roughness of the reflecting plate 28 may be set as a half width at half-maximum (HWHM) ranged between 1-4 degrees. Please refer to FIG. 3. FIG. 3 is a diagram of energy distribution about a diffusion beam generated by the reflecting plate 28 according to the embodiment of the present invention. The beam can be diffused because of the roughness of the reflecting plate 28. As a diffusion angle of the diffusion beam is enlarged, a ratio of the energy distribution can be decreased accordingly. A curve 100 shown in FIG. 3 can represent a relation between the diffusion angle and the energy distribution of the diffusion beam, and a symbol $\alpha$ can represent an included angle between a geometric central line and an edge of the diffusion beam. The diffusion angle corresponding to a relation between a point L and a point R shown in FIG. 3 can be defined as a full width at half-maximum F1 (FWHM), and a half of the FWHW F1 can be equal to the HWHM H1.

As shown in FIG. 2, the second beam B2 and the third beam B3 can be respectively projected onto a first place and a second place of the wavelength conversion module 14 to form a spot P1 and a spot P2. The first place can be different from the second place, and the center C of the reflecting plate 28 can be located between the first place and the second place. In the first embodiment, the third beam B3 can be condensed by the second collimator lens 18 and projected onto the reflecting plate 28; the third beam B3 may be projected onto the diffusion layer 32 if the reflecting plate 28 is covered by the diffusion layer 32. In a demand for adjusting color gamut of the projector 10, the third beam B3 can be reflected by the reflector 22 and condensed by the second collimator lens 18 to project onto the reflecting plate 28 and the wavelength conversion layer 30 simultaneously (or project onto the diffusion layer 32 and the wavelength conversion layer 30 simultaneously), as the spot P2' shown in FIG. 2.

It should be mentioned that the light diffusing component 26 is not limited to the position between the second collimator lens 18 and the wavelength conversion module 14 shown in FIG. 2. The light diffusing component 26 can be optionally disposed between the dichroic filter 20 and the reflector 22, or between the reflector 22 and the second collimator lens 18. Any place located between the dichroic filter 20 and the wavelength conversion module 14 can conform to a design scope of the light diffusing component 26 in the present invention.

Figure 4:
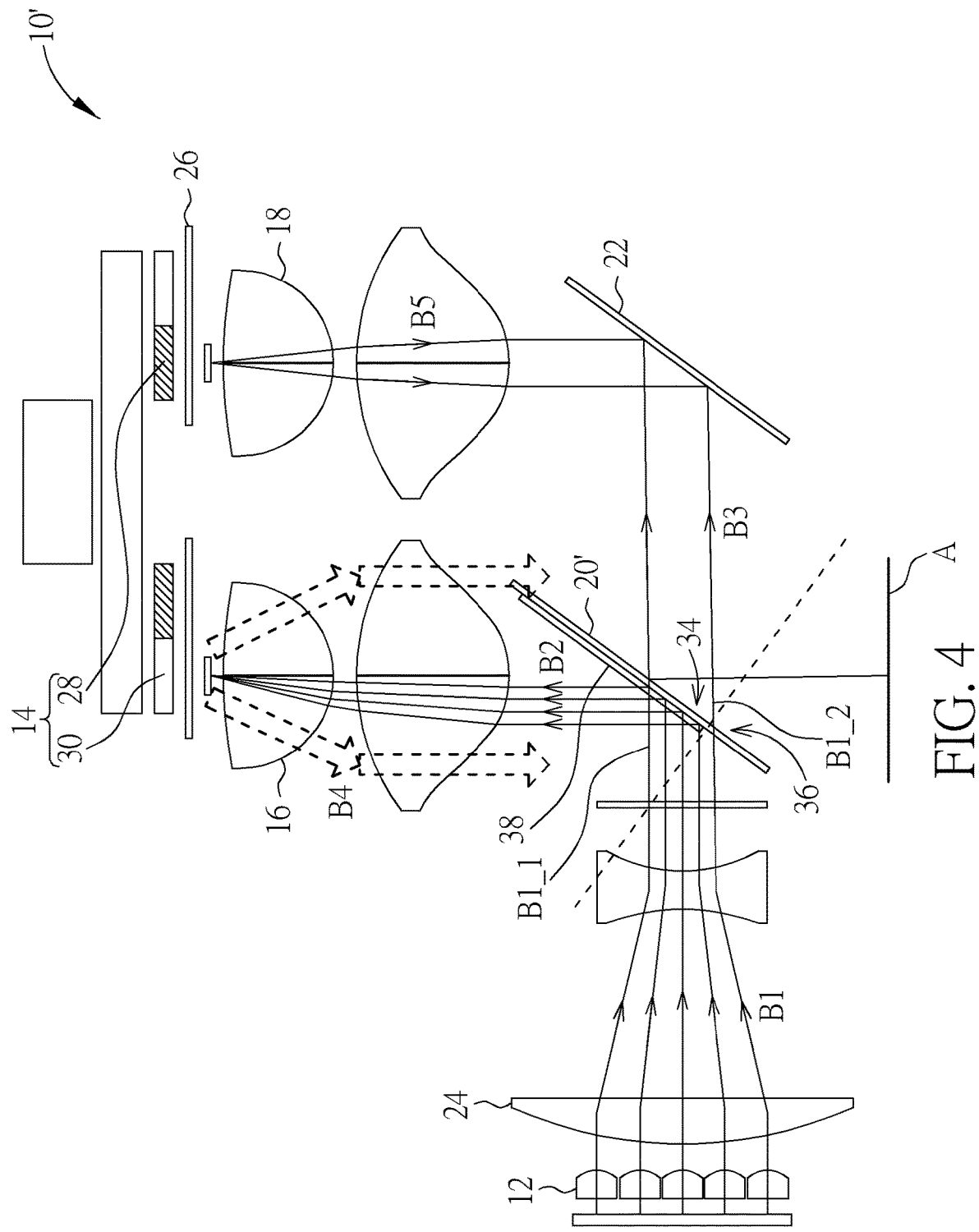
FIG. 4 is a diagram of the projector according to the second embodiment of the present invention.

In the first embodiment, a part of the dichroic filter 20 is not within a light path of the first beam B1; when the first part B1_1 of the first beam B1 is projected onto the dichroic filter 20 for reflection, the second part B1_2 of the first beam B1 can detour, i.e., pass by the dichroic filter 20 to project onto the reflector 22. The second part B1_2 of the first beam B1 detouring the dichroic filter 20 can be represent as the third beam B3 to directly project onto the reflector 22. The present invention provides other possible application to discriminate between the first part B1_1 and the second part B1_2 of the first beam B1. Please refer to FIG. 4. FIG. 4 is a diagram of the projector 10' according to the second embodiment of the present invention. In the second embodiment, elements having the same numerals as ones of the first embodiment have the same structures and functions, and a detailed description is omitted herein for simplicity. Difference between the second embodiment and the first embodiment is: the dichroic filter 20' of the projector 10' can have a first region 34 and a second region 36 connected with each other. The first region 34 can reflect the first beam B1 and allow passing of the fourth beam B4. The second region 36 can allow passing of the first beam B1 and the fourth beam B4.

In the second embodiment, the second region 36 of the dichroic filter 20' can have a transparent property. The second part B1_2 of the first beam B1 can pass through the second region 36 to form the third beam B3. The dichroic filter 20' further can dispose the plating layer 38 on the first region 34 to correspond to the first part B1_1 of the first beam B1. The first beam B1 provided by the light source module 12 can be completely projected onto the dichroic filter 20'. The first beam B1 projected onto the first region 34 can be defined as the first part B1_1, which can be reflected by the plating layer 38 to form the second beam B2; the first beam B1 projected onto the second region 36 can be defined as the second part B1_2, which is not effected by the plating layer 38 and passes through the second region 36 to form the third beam B3. Material property and reflectivity and a penetrating rate of the plating layer 38 can be changed according to a design demand of the projector 10', and the detailed description is omitted herein for simplicity.

In some possible situations, a dimensional ratio of the dichroic filter 20 relative to the light path of the first beam B1 can be varied to acquire a suitable color mixing result; that is to say, a position of the dichroic filter 20 relative to the first beam B1 can be shifted to change the dimensional ratio of the dichroic filter 20 within the light path of the first beam B1 for varying a percentage of the color mixing result.

Figure 5:
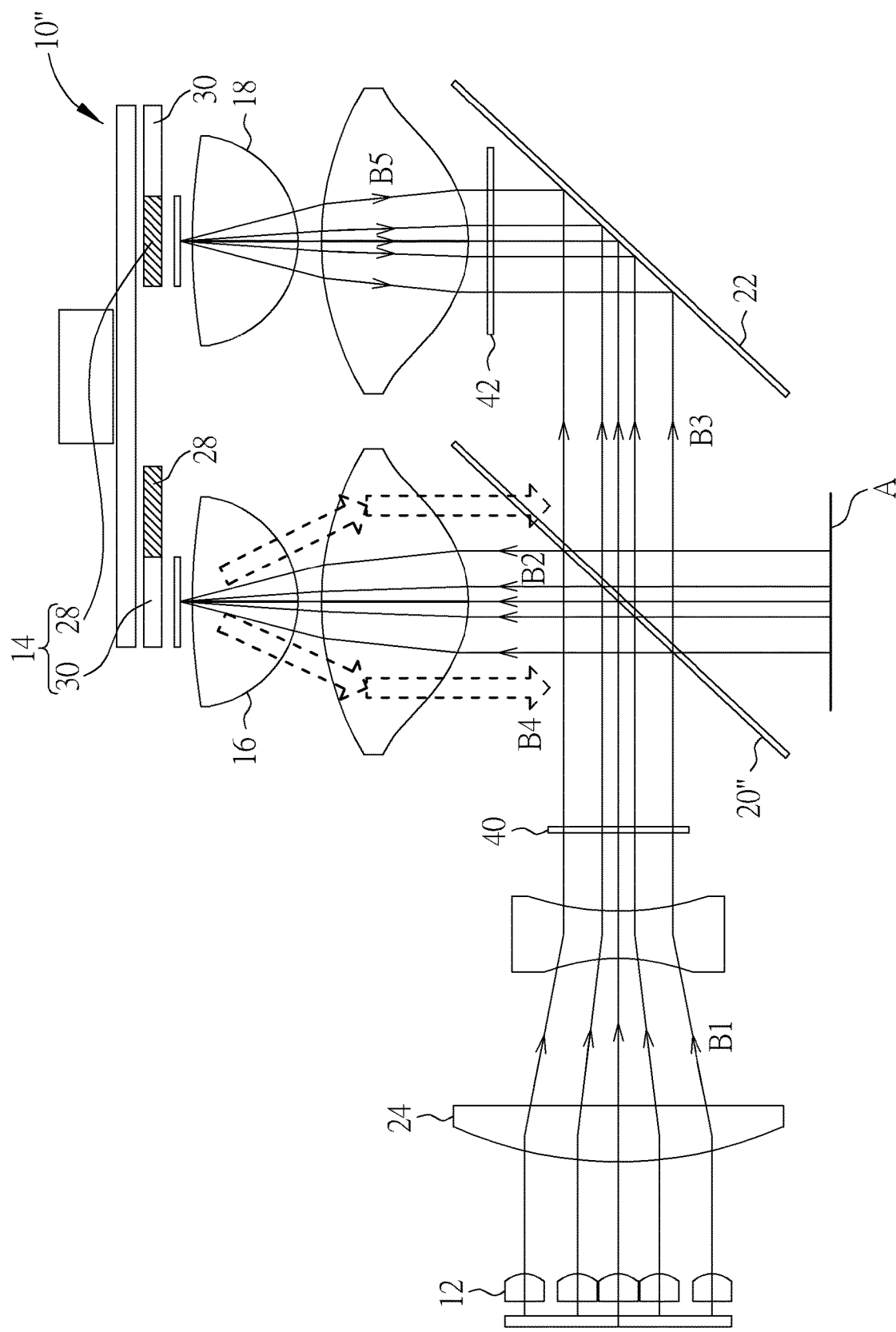
FIG. 5 is a diagram of the projector according to a third embodiment of the present invention.

Please refer to FIG. 5. FIG. 5 is a diagram of the projector 10" according to a third embodiment of the present invention. In the third embodiment, elements having the same numerals as ones of the foresaid embodiments have the same structures and functions, and a detailed description is omitted herein for simplicity. Difference between the third embodiment and the foresaid embodiments is: the dichroic filter 20" of the projector 10" can be passed by a first polarized state beam and reflect a second polarized state beam, and the projector 10" can further include a first phase retardation component 40 and a second phase retardation component 42. The first phase retardation component 40 can be a half-wave plate disposed between the light source module 12 and the dichroic filter 20". The second phase retardation component 42 can be a quarter-wave plate disposed between the dichroic filter 20" and the wavelength conversion module 14. In the third embodiment, any phase retardation component disposed between the dichroic filter 20" and the reflector 22, or between the reflector 22 and the second collimator lens 18, or between the second collimator lens 18 and the wavelength conversion module 14 can conform to the design scope of the second phase retardation component 42 in the present invention.

The first beam B1 provided by the light source module 12 can pass through the light condensing module 24 and the first phase retardation component 40 in sequence, and then be transformed into the third beam B3 with a first polarized state and the second beam B2 with a second polarized state. The second beam B2 with the second polarized state can represent the first part B1_1 of the first beam B1; the third beam B3 with the first polarized state can represent the second part B1_2 of the first beam B1. The second beam B2 with the second polarized state can be condensed by the first collimator lens 16 and projected onto the wavelength conversion layer 30, and the wavelength conversion layer 30 can be excited to generate the fourth beam B4. The fourth beam B4 can pass through the dichroic filter 20 and be transmitted toward the photo-receiving area A. The third beam B3 with the first polarized state can pass through the second phase retardation component 42, and be reflected by the reflector 22 and condensed by the second collimator lens 18 to project onto the reflecting plate 28. Then, the fifth beam B5 with the second polarized state can be generated due to reflection of the reflecting plate 28. The fifth beam B5 can be transmitted toward the photo-receiving area A via the reflector 22 and the dichroic filter 20, and then mixed with the fourth beam B4.

In conclusion, the projector of the present invention can utilize the dichroic filter to divide the beam provided by the light source module into two parts. The dichroic filter can be matched with the wavelength conversion module capable of partly reflecting an illumination beam and partly generating an excitation beam, and the collimator lenses respectively corresponding to the reflecting plate and the wavelength conversion layer, and the reflector used to turn the beam for structuring the alignment module with a least amount of elements inside constrained space for beam mixing. The dichroic filter can change the arrangement position or material property of the plating layer to allow passing or detouring of the beam. The dichroic filter can further provide plural applications; for example, one dichroic filter may reflect some specific-color beam and allow passing of other color beam, or may allow passing of one specific-polarized beam and reflect another polarized beam. Arrangement of the light source module, the dichroic filter and the phase retardation component of the projector may be changed in accordance with the dichroic component having specific features.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
    a light source module adapted to provide a first beam;
    a wavelength conversion module comprising a reflecting plate and a wavelength conversion layer, the wavelength conversion layer being an annular structure disposed on the reflecting plate;
    a first collimator lens disposed on a position corresponding to the wavelength conversion module;
    a second collimator lens disposed on a position corresponding to the wavelength conversion module;
    a dichroic filter disposed between the light source module and the first collimator lens, the dichroic filter being adapted to reflect a first part of the first beam to form a second beam and allow detouring of a second part of the first beam to form a third beam, the second beam being condensed by the first collimator lens and continuously projected onto the wavelength conversion layer to excite a fourth beam, the dichroic filter being further adapted to allow passing of the fourth beam; and
    a reflector disposed between the dichroic filter and the second collimator lens, the third beam being condensed by the second collimator lens and continuously projected onto the reflecting plate to reflect a fifth beam, and the fifth beam being sequentially reflected by the reflector and the dichroic filter to mix with the fourth beam.

2. The projector of claim 1, further comprising:
a light condensing module disposed between the light source module and the dichroic filter, and adapted to condense a projection dimension of the first beam.

3. The projector of claim 1, further comprising:
a light diffusing component disposed between the dichroic filter and the wavelength conversion module.

4. The projector of claim 1, wherein the wavelength conversion layer is the annular structure based on a center of the reflecting plate.

5. The projector of claim 4, wherein the second beam and the third beam are respectively projected onto a first place and a second place of the wavelength conversion module, and the first place is different from the second place.

6. The projector of claim 5, wherein the center is located between the first place and the second place.

7. The projector of claim 1, wherein the annular structure of the wavelength conversion layer is a solid layer.

8. The projector of claim 1, wherein the wavelength conversion module further comprises a diffusion layer disposed on the reflecting plate as an annular form, the diffusion layer aligns with an inner side or an outer side of the wavelength conversion layer.

9. The projector of claim 1, wherein the wavelength conversion module is rotatable.

10. The projector of claim 1, wherein the first beam, the second beam, the third beam and the fifth beam are blue light, the dichroic filter reflects the blue light and allows passing of other color light, the fourth beam is yellow light.

11. The projector of claim 1, wherein the third beam is reflected by the reflector toward the reflecting plate and the wavelength conversion layer.

12. The projector of claim 1, wherein the first part of the first beam is projected onto the dichroic filter, and the second part of the first beam detours the dichroic filter to project onto the reflector.

13. The projector of claim 1, wherein the dichroic filter comprises a first region and a second region connected with each other, the first region reflects the first beam and allows passing of the fourth beam, the second region allows passing of the first beam and the fourth beam.

14. The projector of claim 1, wherein the first beam is completely projected onto the dichroic filter.

15. The projector of claim 14, wherein the dichroic filter allows passing of a first polarized state beam and reflects a second polarized state beam, the projector further comprises:
a first phase retardation component disposed between the light source module and the dichroic filter, and adapted to transform the first beam into the third beam with a first polarized state and the second beam with a second polarized state; and
a second phase retardation component disposed between the dichroic filter and the wavelength conversion module, and adapted to generate the fifth beam with the second polarized state.

16. The projector of claim 1, wherein the dichroic filter comprises a plating layer adapted to reflect the first part of the first beam and allow passing of the second part of the first beam.

17. The projector of claim 1, wherein a half width at half-maximum (HWHM) of a beam reflected by the reflecting plate is ranged between 1-4 degrees.

* * * * *